Sept. 9, 1952 W. M. DROUT, JR 2,610,141
EXTRACTIVE DISTILLATION PROCESS
Filed April 1, 1949
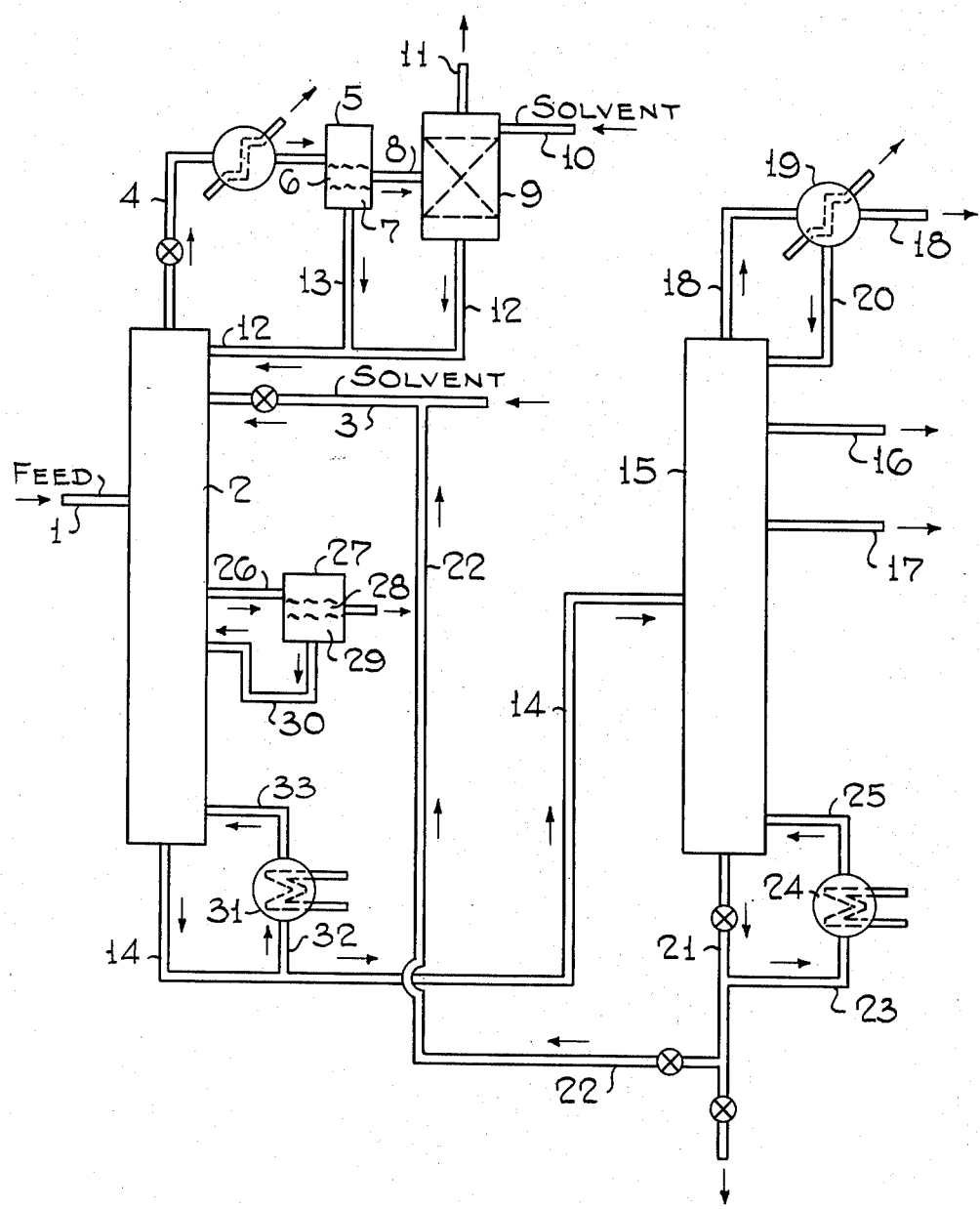
William M. Drout, Jr. Inventor
By Henry Berk Attorney Patented Sept. 9, 1952

2,610,141

UNITED STATES PATENT OFFICE 2,610,141

EXTRACTIVE DISTILLATION PROCESS

William M. Drout, Jr., Linden, N. J., assignor to Standard Oil Development Company, a corporation of Delaware Application April 1, 1949, Serial No. 84,987

6 Claims. (Cl. 202—39.5)

This application is a continuation-in-part of U. S. Patent application Serial No. 24,626, filed May 1, 1948.

This invention relates to the purification of organic liquids and vapors. More specifically the invention relates to an improved extractive distillation process for the purification of organic liquids and vapors. In particular the invention is concerned with the purification of organic liquids by extractive distillation in which the distillation is carried out in the presence of a selective external reflux obtained as the extract phase by extracting the non-solvent phase of the overhead with the solvent employed in the extractive distillation operation.

The invention has wide application and may be employed in extractive distillation operations wherein the distillate is non-homogeneous to accomplish, among others, the following separations: an alcohol from impurities boiling over a wide range and which are insoluble in the distillation solvent; one or more alcohols from other close-boiling alcohols; alcohols from other oxygenated compounds such as ketones, aldehydes, esters, etc.; water from organic compounds such as alcohols, ketones, etc.; hydrocarbons from their isomers such as meta xylene from para xylene; paraffins from olefins, olefins from diolefins; etc. In each of the above mentioned applications the appropriate solvent suitable for the separation, e. g., water, aqueous salt solutions, acetone, hydrocarbon oils, aromatic ethers, etc., is employed during the extractive distillation process. However, the process of this invention is applicable to extractive distillations of all types, i. e., regardless of the separation being made or the particular solvent employed provided the component being removed overhead is insoluble in the distillation solvent. The invention is particularly applicable to those distillations where the overhead separates into two phases or where phase separation can be readily induced, e. g., by changing the temperature of the distillate or by the addition of another component to the distillate. The non-solvent phase of the distillate is extracted with the solvent and the resulting extract is refluxed to the extractive distillation column.

It is an object of this invention therefore to provide a process for the purification of organic liquids by an improved extractive distillation process in which the external reflux is obtained by extracting the non-solvent phase of the distillate with the extractive distillation solvent.

It is another object of this invention to provide a novel and improved process for the purification of alcohols, particularly alcohols of 2 to 5 carbon atoms produced by the reaction of mono-olefins, by removing therefrom impurities both water-soluble and water-insoluble and odor-producing contaminants.

These and other objects of the invention are accomplished by subjecting the organic liquid to extractive distillation in a distillation zone in the presence of an extractive distillation solvent the nature, condition and amounts of which are determined by the purification being effected, and carrying out the distillation in the presence of an external reflux consisting of the solvent phase obtained by extracting the non-solvent phase of the distillate with the extractive distillation solvent.

Although the invention is applicable to the separations listed above among others, it is particularly applicable to the purification of aliphatic alcohols, especially those of 2 to 5 carbon atoms per molecule prepared from mono-olefins either by acid catalysed hydration or by the so-called oxo-synthesis of an olefin with carbon monoxide followed by hydrogenation.

This invention will be described in its application to the purification of crude alcohols produced from mono-olefins but it is to be understood that the invention is not limited thereto since it has equal application to other extractive distillations regardless of the separations being effected provided the distillate upon condensation is di-phase.

By operating according to the terms of this invention high yields of highly refined alcohol of excellent odor characteristics can be produced for use in specialized industries, such as the cosmetic, perfume, drug, biological and vitamin industries. Heretofore, such alcohols were obtained only in very poor yields and at high cost by repeated refractionations of partially refined alcohols.

In order to show the number and diversity of the impurities present in alcohol resulting from catalyzed hydration processes, the following analysis is given for a sample of crude isopropanol produced by the sulfuric acid hydration of propylene, the proportions are based on an anhydrous alcohol basis:

Isopropanol _____ 90 volume percent
Diisopropyl ether _____ 5–10 volume percent
Acetone _____ ⎫
Hydrocarbons (B. P. 60–300° C., major portion 100–300° C.) _____ ⎬ up to 2 vol. percent
Oxygenated compounds other than acetone incl. ethers, tertiary butyl alcohol and higher alcohols, higher ketones, etc. _____ ⎪
Traces of sulfur compounds, boiling over a wide range __ ⎭

A typical analysis of a sample of the polymer product, in this case the so-called "propyl oil" resulting from the production of isopropanol by the sulfuric acid hydration of propylene, is as follows:

55 weight percent secondary—heptanol (B. P. 137–140° C.)
21 weight percent secondary—octanol (B. P. 160–165° C.)
2 weight percent $C_7$ ketone—(B. P. 131° C.)
13 weight percent hydrocarbons (B. P. above 60°—up to about 300° C., chiefly polymers and copolymers of propylene)
9 weight percent ethers (B. P. above 100° C.) e. g. t-butyl isopropyl ether
Traces of sulfur compounds According to this invention the crude aqueous alcohol mixture containing the impurities above described is subjected to a distillation operation in which the crude homogeneous alcohol solution is fed to a distillation tower at a point below the top, preferably at about the mid-point of the tower, and in which water is fed to the top of the tower or at a point near the top thereof in sufficient quantity to maintain a composition of 65–99.9 mol percent in the liquid phase in the column. The operable water concentration as determined by the water solubility of the alcohol will vary with the crude alcohol mixture being purified, e. g., ethanol 65–99 mol percent, preferably 80–99 mol percent; isopropanol 70–99 mol percent, preferably 85–99 mol percent; sec-butanol 95–99.9 mol percent; and sec-amyl alcohols 97.5–99.9 percent. Operation at elevated temperature and pressure greatly broadens the solubility range of secondary butanol and secondary amyl alcohol. For example, at 107° C. secondary butanol is completely miscible with water, and at 188° C. secondary amyl alcohol is completely miscible with water. Another method of enhancing the solubility of secondary butanol and sec-pentanol is the addition of low molecular weight oxygenated compounds, such as low molecular weight alcohols. In the case of sec-pentanol, acetone may be employed as a solubilizer.

The water thus supplied is sufficient to permit taking overhead all or substantially all of the impurities, particularly the water-insoluble impurities, contained in the crude alcohol, namely, the ethers, ketones, other alcohols, light hydrocarbons some of which impurities boil as low as 30° C., and even all or a substantial portion of the high boiling polymer oils. The distillation tower is operated without the conventional external reflux of part or all of the total distillate condensate. Instead the column distillate is condensed and the non-solvent phase of the distillate is extracted with the extractive distillation solvent, i. e., water and the extract phase is refluxed to the column.

Many of the impurities taken overhead boil normally at a temperature above the boiling point of the alcohol which is being purified, e. g., the polymer oils which boil as high as 250° C. to 300° C. Additional polymer oil impurity, particularly a portion of the higher boiling fractions thereof, concentrates in the column at a point near the alcohol feed plate upon contact of the crude alcohol feed with the internal aqueous reflux. This concentration of polymer oil occurs near the alcohol feed plate. A stream containing the polymer concentrate is removed from the distillation column at this point and the polymer removed therefrom by decantation. The dilute alcohol phase is returned to the column at a point about one plate below the withdrawal point. In this manner practically all the odor-producing contaminants are removed from the alcohol. The dilute aqueous alcohol product obtained as bottoms from the distillation zone and containing between 65-99 mol percent water is led to a concentrating column, wherein the desired alcohol is concentrated and recovered in high yields. The product is far superior in odor to any alcohol obtained by any of the purification methods known to the art.

If desired, the crude aqueous alcohol may be treated prior to the extractive distillation step, with additional amounts of water to throw out of solution the bulk of the polymer oil, particularly the higher boiling constituents of the polymer oil.

It has been found that 95 vol. percent of the alcohol present in a crude aqueous isopropyl alcohol from the hydration of propylene having the following composition, can be recovered as high purity, excellent odor alcohol, by concentrating the weak alcohol recovered as bottoms from a 45 plate water extractive distillation column:

65 vol. percent isopropanol
1.4 vol. percent propyl oil (based on alcohol content)
0.2 vol. percent acetone (based on alcohol content)
5.1 vol. percent isopropanol ether (based on alcohol content)
Balance—water and other impurities In application Serial No. 68,453 filed December 31, 1948 and assigned to the present assignee, there is described an extractive distillation process in which the customary external reflux is omitted so that vapors are removed from the distillation column without further condensation above the point of entry of the extractive distillation solvent. As described in said application with reference to alcohol purification optimum quality alcohol can be obtained by operating the extractive distillation column with no external reflux. However, if the number of plates in the extractive distillation column is small enough so that excessive alcohol loss from the top of the column occurs then the selective reflux principle of this invention is recommended. This selective reflux is obtained in the case of alcohol purification by water extratcing the non-aqueous phase of the condensed distillate and refluxing the resulting extract in whole or in part to the extractive distillation zone.

The accompanying drawing represents a flow plan in elevation of one process and accompanying apparatus for carrying out this invention.

Referring to the drawing, numeral 2 represents an extractive distillation tower, such as a 45 plate column, to which crude isopropyl alcohol or partially refined isopropyl alcohol containing 0 to 60 vol. per cent water is fed via line 1. The feed line is located at a point preferably above the midsection of the distillation column, for example, at about the 30th plate in a 45 plate tower. Water is fed to the tower in considerable amounts through line 3. The water is fed to the top or near the top of the tower but always above the alcohol feed plate. To obtain the desired separation of the impurities from the alcohol, the mixture is subjected to a continuous fractional distillation in column 2. The water introduced in sufficiently large quantity at the upper part of the tower effectively modifies the relative volatilities of the organic compounds being separated, and distillation of an extremely large part of the impurities from the alcohol is effected. The temperature of the water feed to the extractive distillation zone is preferably close to the temperature of the liquid on the water feed plate, although it may be lower to partially condense vapors ascending to the water feed plate. For continuous efficient operation, the water must be added continuously near the top of the column while the crude alcohol being purified is continuously fed into the column at a lower point and while sufficient heat is provided to afford distillation throughout the column. The feed stream may be preheated to a temperature close to that of the internal liquid reflux under equilibrium boiling conditions at the point of introduction. The preheated alcohol feed stream may be liquid, partially vaporized or completely vaporized when introduced into the fractionation column. Vapors of the organic compounds introduced as a feed stream pass upwardly through the distillation zone in contact with descending internal liquid reflux under equilibrium reboiling and refluxing conditions. Due to the fact that water, considerably in excess of the amount of water distilled, is introduced to mix with the condensate near the top of the distillation zone, the water concentration in the internal liquid reflux at the top of the distillation zone is higher than the water concentration in vapors passing up through the zone. Contrasted therewith in normal rectification of alcohols from an aqueous feed, the water concentration diminishes rapidly toward the limiting water concentration of the aqueous azeotropes in the vapors ascending the distillation column.

The quantity of water required to be introduced continuously at the upper part of the distillation zone for accomplishing the desired separation of the impurities from the alcohol is considerably greater than the quantity of condensate with which it becomes homogeneously mixed on each plate in order to make the water concentration of the internal reflux substantially above a critical minimum in the range of 70–99.9 mol per cent. With adequate water concentration in the internal reflux for effecting the separation, the alcohol to be isolated in the aqueous bottoms is dissolved in the aqueous internal reflux that reaches the bottom of the distillation column. Excellent quality isopropyl alcohol was obtained by adjusting the alcohol to water feed ratio so that 15–25 vol. per cent alcohol was obtained from the bottom of the distillation column.

Referring to the drawing, impurities contained in the isopropyl alcohol, namely, isopropyl ether, acetone, a substantial part of the propyl oil, etc., and a small percentage of the solvent water which is carried overhead are removed as distillate via line 4 condensed and lead to decanter 5. In the decanter the condensate separates into two phases, namely, an aqueous phase 7 and an organic phase 6. The organic phase is lead via line 8 to an extraction zone 9 entering at a point at the midsection thereof. In the extraction zone the organic phase is countercurrently extracted with water entering at a point near the top of the extraction zone via line 10. In the extraction zone the materials separate into a raffinate phase consisting of hydrocarbons and other water insoluble materials. This phase is withdrawn via line 11. The aqueous extract phase is withdrawn via line 12 and refluxed to the top of the distillation zone 2 via line 12 together with the aqueous phase which is removed from decanter 5 via line 13. It is also possible to return the reflux in whole or in part through solvent feed line 3.

It is also within the scope of this invention to add the entire amount of distillation solvent to the system via line 10. In this event the solvent feed line 3 may be dispensed with.

The overhead condensate has been represented as separating into an upper organic phase and a lower aqueous phase. It should be borne in mind that in some distillations, for example, in which a hydrocarbon solvent is employed as an extractive distillation solvent the upper phase would be the solvent phase while the lower phase would be the non-solvent phase. Likewise the same situation would occur in the extraction zone wherein the upper phase depending upon the solvent employed may become the extract phase and the lower phase the raffinate phase. In any event it is the non-solvent phase of the condensated distillate which is extracted in the extraction zone which is returned to the distillation zone as reflux.

Although the overhead from the distillation column contains approximately 5 volume per cent of the isopropyl alcohol fed to the distillation zone it is possible by employing optimum distillation conditions to hold the alcohol content of the overhead to a much smaller amount, say about 1 volume per cent. However, if an extremely pure product is desired, e. g., practically 100% pure alcohol, it may be attained at the expense of additional alcohol going overhead with the impurities being removed. This alcohol is recovered by extraction of the overhead organic phase and is returned to the distillation zone together with the aqueous phase of the condensed distillate.

Additional high boiling polymer oil has been found to concentrate as a separate phase in column 2 at a point near the alcohol feed plate when the feed is mixed with the aqueous reflux stream. A sidestream containing this polymer oil concentrate is removed from the column and the polymer oil is separated by continuous decantation, thus minimizing or virtually eliminating polymer oil from the concentrating column. This sidestream is removed from the column at a point below the crude alcohol feed plate, but preferably at a point immediately below the alcohol feed plate. To this end a stream can be removed from tower 2 via line 26 and sent to decanter 27. This stream is withdrawn at a point near the alcohol feed plate or slightly below the alcohol feed plate. In the decanter the stream separates into an upper polymer oil phase 28 which is discarded, and a lower aqueous alcohol phase 29 freed of polymer oil. The latter is returned to the tower via line 30 at a point about a plate below the withdrawal point.

Bottoms from the tower 2, consisting chiefly of aqueous alcohol of about 10-40 vol. per cent, preferably 15-25 vol. per cent is removed via line 14 and introduced to concentrating column 15. Part of the aqueous bottoms is withdrawn from line 14 via line 32 and sent to reboiler 31 for heating by indirect or direct heat exchange with a heating medium such as live steam, and returned via line 33 to the distillation column. In column 15 the aqueous alcohol is concentrated to the desired level up to the 91.3 vol. per cent isopropyl alcohol-water azeotrope, which is removed as a sidestream near the top of the column via line 16. The remaining propyl oil, if any, contained in the aqueous alcohol is removed from the concentrating column in a sidestream 17 at a point about three plates above the feed plate. Some remaining traces of light material, if any, and alcohol are removed overhead via line 18, condensed in condenser 19 and removed from the system. If desired, this overhead may be recycled to the feed to the extractive distillation zone. Part of the condensate may be refluxed to the top of the column via line 20. Bottoms from the concentrating column consisting substantially of water are removed via line 21 and may be recycled by line 22 in whole or in part to the extractive distillation tower 2 via water supply line 3. Excess water may be removed from the system via line 21. A portion of the aqueous bottoms may be withdrawn via line 23 and sent to reboiler 24 for heating by indirect or direct heat exchange with a heating medium such as live steam and recycled to column 15 via line 25. Although the dilute aqueous alcohol solution from the distillation zone has been described as concentrated by fractional distillation, other means of concentration may be employed, such as solvent extraction.

In the separation of impurities from isopropanol produced by the acid catalyzed hydration of propylene, essentially no satisfactory separation is effected if the internal reflux contains less than 70 mol per cent water. For obtaining satisfactory results on a practical scale the preferred range is 85-99 mol per cent water in the internal reflux.

Under steady conditions in the extractive distillation zone, the internal reflux, having adequate water concentration for accomplishing the separation of the wide-boiling impurities, tends to have a nearly constant water concentration in a preferably homogeneous liquid phase at each plate, and the high water concentration is approximately uniform in the internal reflux below the alcohol feed plate. This internal reflux in flowing from the top to the bottom of tower becomes richer in the alcohol while the other impurities of the feed become distilled overhead.

In the distillation process the mol per cent water in the total overhead from the extractive distillation column will vary with the operating conditions and with the nature of the impurities rejected overhead. The aqueous bottoms removed from the extractive distillation zone will contain approximately 70-99 mol per cent water. The overhead from the extractive distillation zone upon condensation and cooling separates into two phases, an aqueous phase and an organic phase. An Engler distillation of a typical organic phase, resulting from the purification of isopropanol reveals that the initial boiling point lies between 40-50° C., and the final boiling point is approximately 250° C., indicating that there is considerable high boiling material contained in the overhead.

Without attempting to explain the mechanism by which the desired separation occurs in the distillation column, it can be said that the process is one of vapor-liquid extraction in which the vapors contain a greater relative concentration of the impurities than under the normal fractionation conditions in the absence of the considerable amount of water internal reflux. It is evident from the results obtained that the water employed within the limits specified, increases the effective vapor pressures of the impurities relative to the vapor pressure of the alcohol being purified, thus allowing the impurities to pass overhead from the distillation zone. Although it is preferable not to have any plates in the tower above the water feed plate, it is possible to carry out the separation with a limited number of plates above the water feed plate. However, this number should be held to a minimum.

Although the invention has been described employing pure water in the distillation process, it is also permissible in the purification of alcohols to use water containing a small amount of salts, such as sodium acetate, or acid, such as sulfuric acid or even caustic, such as sodium hydroxide.

Although the invention has been illustrated by the purification of isopropanol, it is equally applicable to the purification of other alcohols of 2 to 5 carbon atoms per molecule resulting from the reaction of mono-olefins, such as ethanol, tertiary butanol, secondary butanol, the secondary amyl alcohols, and tertiary amyl alcohol. In this regard the impurities are removed in a manner similar to that described for the isopropanol system. The following are approximate typical compositions of some of the crude aqueous alcohols which may be treated according to this purification process:

CRUDE ETHYL ALCOHOL 80-85 weight per cent ethyl alcohol
9-14 weight per cent ethyl ether
0.2-0.8 weight per cent hydrocarbons (B. P. 30-300° C.)
2.5-5 weight per cent colloidal carbon

CRUDE SECONDARY BUTYL ALCOHOL 75 weight per cent butyl alcohol
5 weight per cent secondary butyl ether
4 weight per cent polymer oils
Balance water and other impurities

CRUDE SECONDARY AMYL ALCOHOLS 50 volume per cent sec-amyl alcohol
20 volume per cent hydrocarbons
5-10 volume per cent sec-butyl alcohol
2-5 volume per cent tertiary amyl alcohol
5-10 volume per cent water
2-3 volume per cent ethers, e. g. sec-amyl, sec-butyl and mixed ethers
2-5 volume per cent higher alcohols, e. g. hexyl alcohols
1-2 volume per cent ketones, e. g. diethyl ketone of methyl propyl ketone As previously mentioned, the operating conditions will vary with the nature of the alcohol being purified. In this respect the amount of water added to the distillation column is important. When purifying secondary butanol, it has been found that sufficient water should be added to the distillation column to maintain a composition of 95–99.9 mol per cent water in the liquid phase in the column. For secondary amyl alcohols sufficient water should be added to maintain a composition of 97.5 to 99.9 mol per cent water in the liquid phase in the column.

The following data obtained with a 55 plate extractive distillation column indicate that the use of a selective reflux does not greatly affect the quality of the recovered product. The data reported in Table I were obtained in the purification of a crude isopropanol solution obtained by the sulfuric acid-catalysed hydration of propylene. The crude alcohol was fed to the 40th plate of the column while the solvent water was added to the 55th plate. The selective reflux was obtained by feeding the organic phase of the condensed overhead to a three-stage countercurrent water extractor. The water extract phase was then pumped back to the top of the column together with the water phase of the condensed distillate.

TABLE I
55 Plate laboratory column

| Reflux | Mol per cent $H_2O$ in column | Temp. of $H_2O$ Added (°C.) | Percent Organic Material Ejected in Heads | IPOH Concn. (Vol. per cent) in Column Bottoms | Percent IPOH Yield | Optical Density of Product [1] | |
|---|---|---|---|---|---|---|---|
| | | | | | | 2250Å | 2700Å |
| None | 93.5 | 94–96 | 13.5 | 19.5 | 90.3 | 0.133 | 0.000 |
| Do | 93.2 | 69–71 | 6.7 | 19.6 | 95.8 | 0.124 | 0.034 |
| Selective reflux | 93.7 | 94–96 | 13.5 | 19.3 | 98.2 | 0.139 | 0.005 |
| Do | 93.6 | 69–71 | 6.7 | 19.4 | 99.0 | 0.120 | 0.042 |

54 PLATE COMMERCIAL PILOT PLANT COLUMN

| | | | | | | | |
|---|---|---|---|---|---|---|---|
| None | 93.5 | 96–98 | 11.6 | 21.5 | 94.9 | 0.241 | 0.200 |
| Selective reflux | 92.5 | 96–98 | 12.5 | 25.1 | 97.2 | 0.218 | 0.100 |

[1] In comparison with distilled water. Odor of alcohol increases with increasing optical density at these wave lengths.

The data in the above table indicate that an appreciable increasing yield of isopropanol alcohol has been obtained without any sacrifice in the quality of the product obtained as reflux by the optical density measurements.

In addition to the purification of aliphatic alcohols as outlined, the invention is also applicable to the following extractive distillation processes:

| Object of Distillation | Extractive Distillation Solvent |
|---|---|
| Separation of close-boiling alcohols, e. g. ETOH (overhead) from IPOH (bottoms), i-BuOH (overhead) from N-BuOH (bottoms), etc. | Higher alcohols, sulfolane, phenol, glycols, glycol ethers, esters, ether-esters, hydrocarbons, salts, etc. |
| Separation of alcohols (bottoms) from non-alcoholic oxygenated compounds (overhead). | $H_2O$ (50–99.9 mol percent, preferably 85–99 mol percent). |
| Dehydration of alcohols | Water immiscible alcohols, gasoline, etc. |
| Separation of acetone from neutral oxy compounds. | Water. |
| Separation of MEK from SBOH | Do. |
| Separation of aromatic hydrocarbon isomers or of different types of aromatic hydrocarbons. | Hydrotropic salts, e. g. sulfonates, etc. |
| Separation of paraffins from olefins, olefins from diolefins. | Acetone, furfural, etc. |

The process is applicable whether the desired component is being recovered overhead from the extractive distillation tower or whether it is recovered as a solution in the solvent at the bottom of the tower, since the purpose of the solvent is to improve the relative volatility (alpha) of the components regardless of the direction in which they are separated.

What is claimed is:

1. In the separation of organic component A from organic component B by extractive distillation wherein components A and B are introduced into a fractional distillation zone at an intermediate point thereof, wherein a distillation solvent is introduced into the fractional distillation zone at a point above the point of introduction of components A and B and heat applied to effect vaporization of the components one of which is removed overhead from the extractive distillation zone as a vapor and the other as bottoms dissolved in the solvent, and wherein the overhead condenses into a solvent phase and a non-solvent phase containing quantities of the bottoms component, the improvement which comprises extracting the non-solvent phase with the distillation solvent and returning the extract and the solvent phase to the distillation zone.

2. The method of refining a crude aliphatic alcohol produced by reaction of a mono-olefin, said crude alcohol containing contaminants lower boiling and higher boiling than the alcohol, which comprises continuously feeding the crude alcohol to a fractional distillation zone at an intermediate point thereof, continuously feeding sufficient water to the fractional distillation zone at a point substantially above the crude alcohol feed point to maintain an internal liquid reflux having a water content in the range of 65–99.9 mol per cent water below the point of addition of the water, distilling from said crude alcohol a vaporous mixture comprising both lower boiling and higher boiling contaminants and quantities up to 5 vol. % of the aliphatic alcohol wherein the vaporous mixture flows countercurrent to the internal aqueous liquid reflux, removing the vaporous mixture overhead from the fractional distillation zone, condensing the overhead to form an aqueous phase and a non-aqueous phase, extracting the non-aqueous phase with water to form a second aqueous phase and a second non-aqueous phase, introducing both aqueous phases to the distillation zone and withdrawing a dilute aqueous solution of the alcohol freed of the thus distilled contaminants from a lower portion of said fractional distillation zone.

3. The method of claim 2 in which the alcohol is a $C_2$–$C_5$ aliphatic alcohol.

4. The method of refining crude isopropanol produced by the reaction of propylene, said crude isopropanol containing contaminants lower boiling and higher boiling than the isopropanol, which comprises continuously feeding crude isopropanol to a fractional distillation zone at an intermediate point thereof, continuously feeding sufficient water to the fractional distillation zone at a point to maintain an internal liquid reflux having a water content in the range of 70-99 mol per cent water below the point of addition of the water, distilling from said crude isopropanol a vaporous mixture comprising both higher boiling and lower boiling contaminants and quantities up to 5 vol. % of isopropanol wherein the vaporous mixture flows countercurrent to the internal aqueous liquid reflux, removing and condensing the vaporous mixture overhead from the fractional distillation zone, whereby an aqueous phase and a non-aqueous phase are formed, extracting the non-aqueous phase with water to form a second aqueous phase and an organic raffinate phase, refluxing both aqueous phases to the distillation zone, and withdrawing a dilute aqueous solution of isopropanol freed of the thus distilled contaminants from a lower portion of said fractional distillation zone.

5. A process according to claim 4 in which the internal liquid reflux has a water content in the range of 85-99 mol per cent.

6. The method of refining crude sec-butanol produced by the reaction of n-butenes, said crude sec-butanol containing contaminants lower boiling and higher boiling than the sec-butanol, which comprises continuously feeding crude sec-butanol to a fractional distillation zone at an intermediate point thereof, continuously feeding sufficient water to the fractional distillation zone at a point to maintain an internal liquid reflux having a water content in the range of 95-99.9 mol per cent water below the point of addition of the water, distilling from said crude sec-butanol a vaporous mixture comprising both higher boiling and lower boiling contaminants and quantities up to 5 vol. % of sec-butanol wherein the vaporous mixture flows countercurrent to the internal aqueous liquid reflux, removing and condensing the vaporous mixture overhead from the fractional distillation zone, whereby an aqueous phase and a non-aqueous phase are formed, extracting the non-aqueous phase with water to form a second aqueous phase and an organic raffinate phase, refluxing both aqueous phases to the distillation zone, and withdrawing a dilute aqueous solution of sec-butanol freed of the thus distilled contaminants from a lower portion of said fractional distillation zone.

WILLIAM M. DROUT, JR.

REFERENCES CITED

The following references are of record in the file of this patent:

UNITED STATES PATENTS

| Number | Name | Date |
|---|---|---|
| 996,328 | Guillaume | June 27, 1911 |
| 1,929,901 | Ricard et al. | Oct. 10, 1933 |
| 2,148,846 | Von Retze et al. | Feb. 28, 1939 |
| 2,198,651 | Bludworth | Apr. 30, 1940 |
| 2,290,442 | Metzl | July 21, 1942 |
| 2,324,755 | Beamer | July 20, 1943 |
| 2,339,160 | Dunn et al. | Jan. 11, 1944 |
| 2,360,655 | Deanesly | Oct. 17, 1944 |
| 2,377,049 | Souders | May 29, 1945 |